Figure 1:
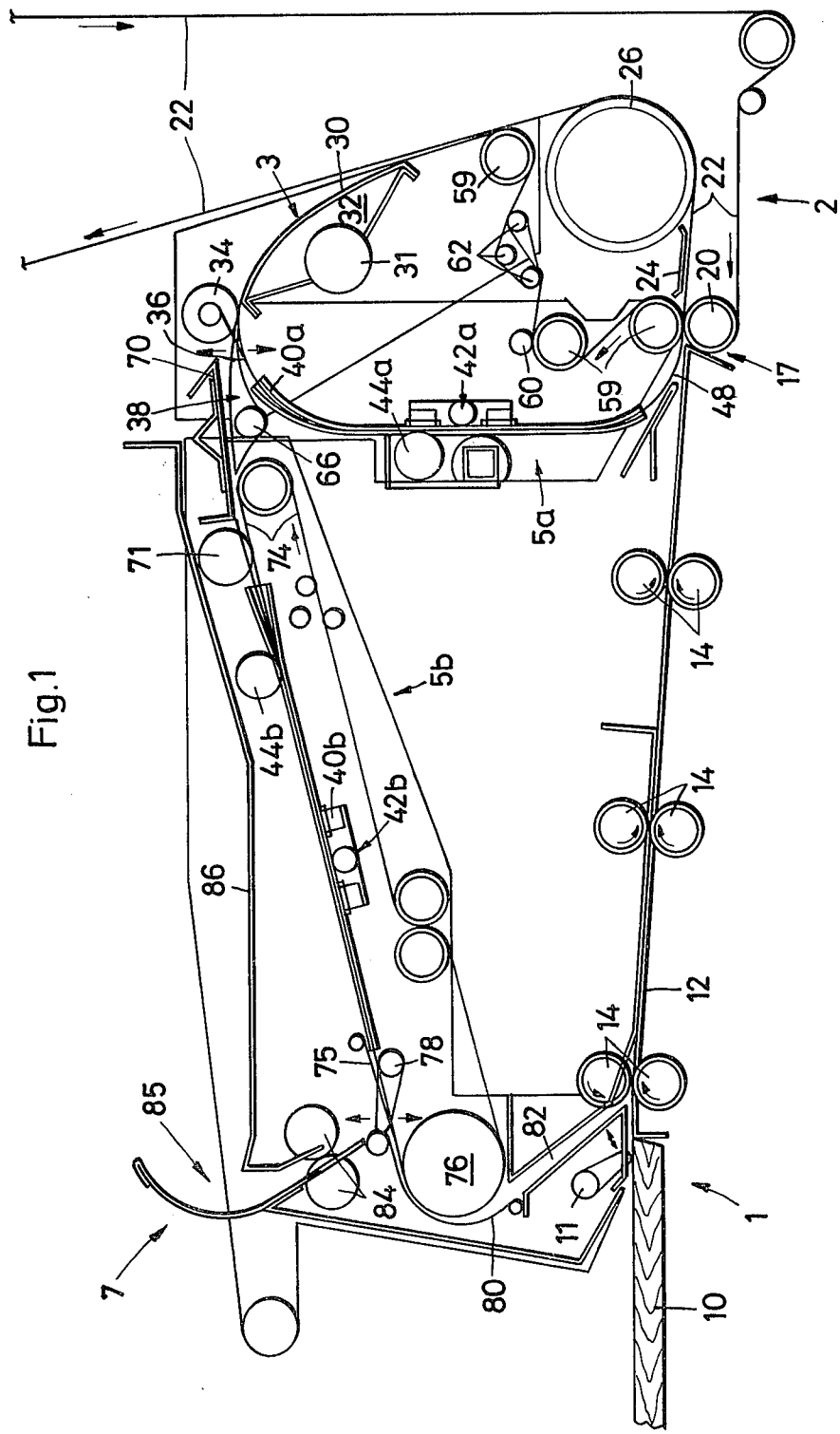

United States Patent [19]

Scheid et al.

[11] 4,072,305
[45] Feb. 7, 1978

[54] PHOTOCOPYING MACHINE HAVING A REPEAT MECHANISM

[75] Inventors: Karl Scheid; Werner Schweisfurth, both of Siegen; Eberhard Quast, Friesenhagen, all of Germany

[73] Assignee: Meteor-Siegen Apparatebau Paul Schmeck GmbH, Siegen, Germany

[21] Appl. No.: 718,617

[22] Filed: Aug. 30, 1976

[30] Foreign Application Priority Data

Sept. 6, 1975 Germany .............................. 2539799

[51] Int. Cl.² .......................................... B65H 29/64
[52] U.S. Cl. ....................................... 271/3; 271/172; 271/229; 271/251; 271/270; 355/109
[58] Field of Search ................... 271/3, 226, 229, 234, 271/248, 250, 251, 270, 172, 64; 355/102, 109

[56] References Cited

U.S. PATENT DOCUMENTS 3,709,596 1/1973 Ulmer .............................. 271/251 X
3,966,198 6/1976 Komada .............................. 271/265

Primary Examiner—Richard A. Schacher
Attorney, Agent, or Firm—Olson, Trexler, Wolters, Bushnell & Fosse, Ltd.

[57] ABSTRACT

A photocopying machine is provided with a repeat mechanism. After the original material to be copied has left the exposure station a feed mechanism is provided by optionally returning the original material to the exposure station for making of a second copy. Two return mechanism paths are provided for originals of different length.

7 Claims, 5 Drawing Figures

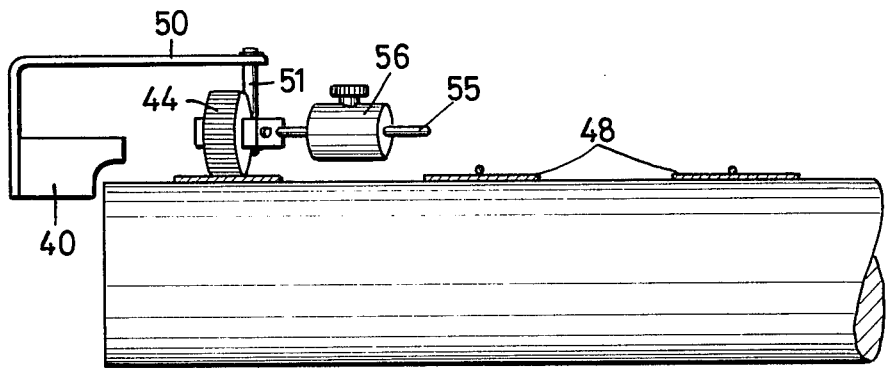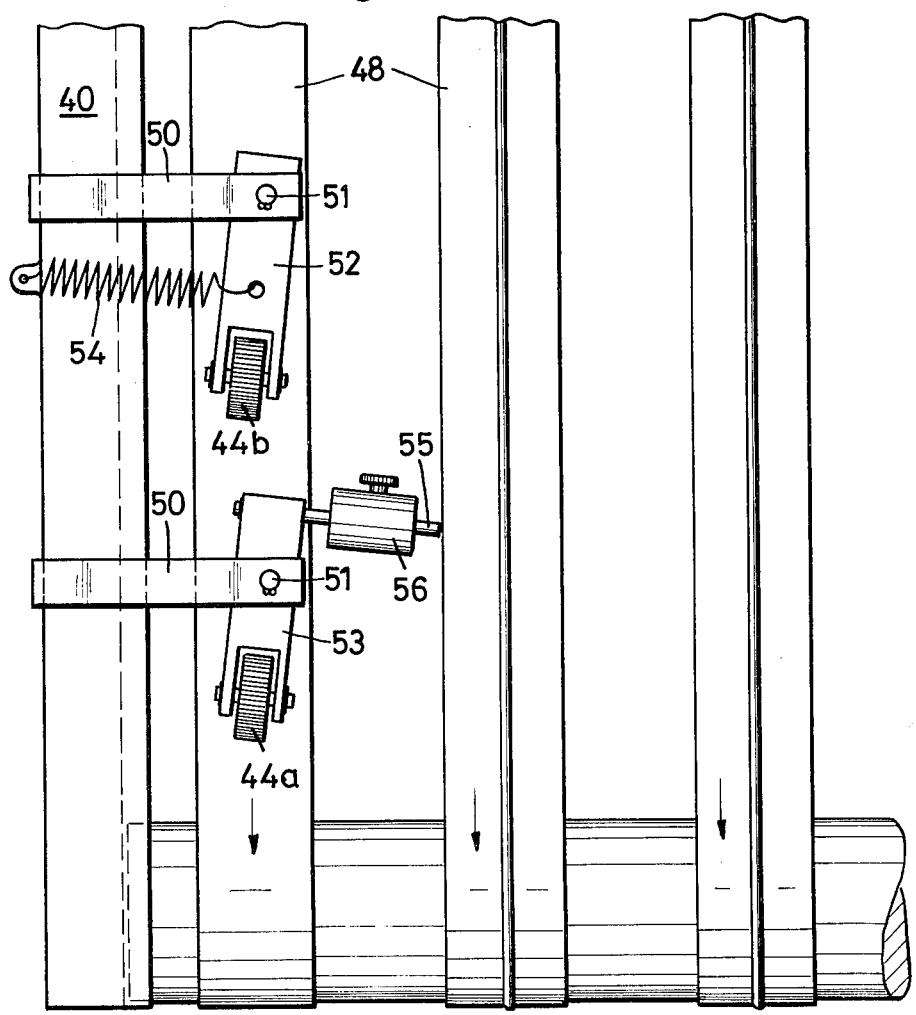

PHOTOCOPYING MACHINE HAVING A REPEAT MECHANISM

BACKGROUND OF THE INVENTION

The invention relates to a photocopying machine comprising a repeat mechanism which, after the original has left the exposure station, optionally returns it into the entry position, comprising a feed mechanism which feeds the original and the copying material past the exposure station, a separating station which is arranged behind the exposure station and which separates the original from the copying paper and a return feeding arrangement which picks up the original and supplies it to the entry members on the feed table and simultaneously moves it for the purpose of alignment on to a lateral bearing edge.

Repeat mechanisms on photocopying machines have long been known, from U.S. Pat. No. 2,574,215 ( — Swiss Pat. No. 257,430). Also known are various proposals for ensuring, with the return of the original, that the said original during the renewed entry into the exposure station is so aligned laterally that it is not shifted laterally in relation to the copying material (which generally is prepared or made ready in a specific lateral position by the photocopying machine itself) (as indicated in German Offenlegungsschrifts Nos. 2,220,397 and 2,348,426). It is a disadvantage with these known photocopying machines comprising repeat mechanisms, of which the return feeding arrangement simultaneously aligns the original to one side, is that each transverse movement of the original serving for the lateral alignment is only able to take place when the original has completely moved away from the exposure station. This is because it is only then that those means of the return feeding arrangement serving for the lateral alignment are in the position actually to move the original transversely, whereas it was previously held at its rearward end by the feed mechanism guiding the original past the exposure station. If the force exerted by the aligning means of the return feeding mechanism were to be made sufficiently large for the lateral movement to occur in spite of the holding force of the feeding mechanism, the result would be, at least in many cases, the creasing or even tearing of the original.

OBJECTS OF THE PRESENT INVENTION

Accordingly, the invention has for its object to make possible the lateral alignment of the original by the return feeding arrangement of the repeat mechanism, also in a safe manner, when parts of the original are still retained by the feed mechanism.

In accordance with the invention, this object is achieved by the fact that the transporting speed of the return feeding arrangement is somewhat lower than that of the feed mechanism and a loop of the original is established between the return feeding arrangement and the feed mechanism. In this manner, a certain twisting of the original can be established within the said loop, without any danger to the original being associated therewith, such as would be the case if the original were to be guided while constantly bearing against tapes, rollers or the like of the return feeding arrangement. Consequently, the aligning means of the return feeding arrangement are able already to initiate the lateral alignment of the original at an instant in which parts of the original are still held by the feed mechanism. The possibility which is thereby provided is that the feeding travel within the repeat mechanism can be shortened and the repeat mechanism can thus be made smaller. In addition to the reduction in the cost for equipment, there is also a saving in the operating time when running the photocopying machine, because of the shorter time period.

A lengthening of that section of the original which is stored in the loop and as a consequence a reduction of the specific distortion of the material, and respectively a further shortening of the overall length, is obtained if, in a preferred development of the invention the separating station becomes inoperative as soon as the original has reached the return feeding arrangement. At this instant, the free length of loop is then increased by that section of the original which extends between the outlet point at the exposure station (it is here that the holding action of the feed mechanism ends) and the point of discharge from the separating station.

In a further development of the invention, it is possible to arrange for two return feeding arrangements which are independent of one another and which have return feeding paths of different lengths to be provided and for a shift mechanism which, in a manner known per se, is arranged behind the separating station in the feeding direction, to convey the original, depending on its length, into one or other of the return feeding arrangements.

The return feeding arrangement advantageously comprises an aligning roller which co-operates with a feed roller and which is seated on a rocking lever and is pulled by a spring into an inclined position, but swings into a position which is axially parallel with the feed roller when the original is supported on the bearing edge. Such swivellable aligning rollers are known per se as alignment means (U.S. Pat. No. 3,107,089), but they have not yet been used in conjunction with the return feeding arrangement of a repeat mechanism in a photcopying machine.

It is also to be established that, as general prior art, the formation of loops in the material being conveyed and inside photocopying machines is known per se, but as regards this prior art, it has always hitherto been a question of loops in the copying material for the purpose of being able, depending on the length of the original, to separate the respectively required length of copying material from a supply reel in the stationary position, while at the same time the copying material which has already entered the exposure station of the photocopying machine continues to be transported without any change (see for example German Offenlegungsschrift No. 2,212,957). In the use of a loop of the original formed by different feeding speeds in the photocopying machine, such as provided in accordance with the invention, in order to make possible the lateral alignment of the original after only a partial passage through the exposure station and with distortion of the original loop, novelty is provided in several respects.

DRAWING DESCRIPTION

Figure 2:
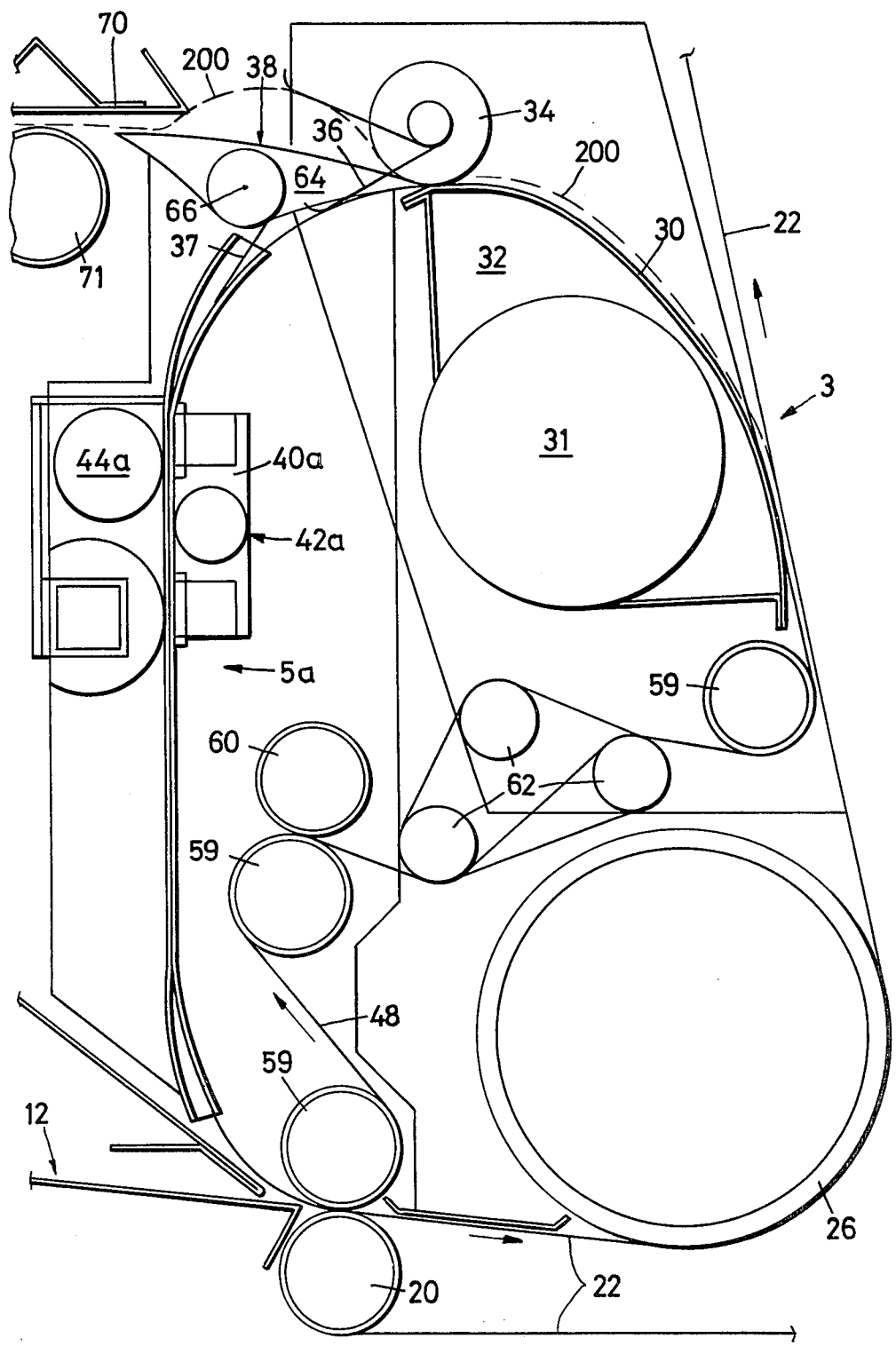
Figure 3:
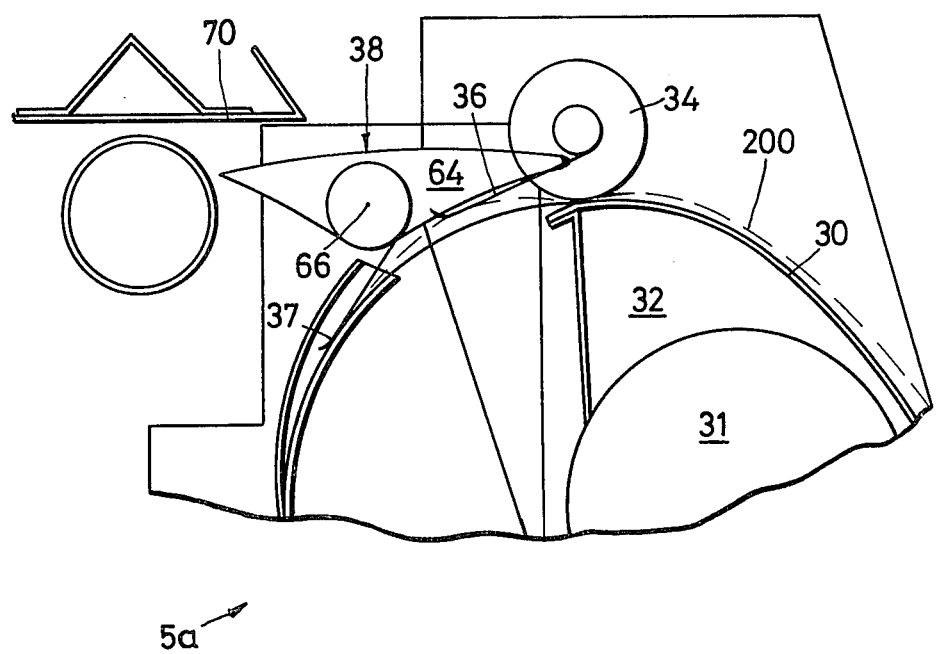

The drawings illustrate the invention by means of one constructional example, and in the drawings:

FIG. 1 is a complete side elevation of the photocopying machine with repeat mechanism as hereinafter described and shown in diagrammatic form, FIG. 2 shows a part of FIG. 1 to a larger scale, with details of a first return feeding arrangement of the repeat mechanism, FIG. 3 is a part of FIG. 2 with a switch mechanism between the first and second return feeding arrangements, this being shown here in its comparison operative position, and FIGS. 4 and 5 show different constructional possibilities in respect of inclined rollers which are used in the return feeding arrangements, in one case seen in elevation and in the other case seen from above.

DETAILED DISCLOSURE OF THE ILLUSTRATIVE EMBODIMENT

The feeding of originals to be manifolded is effected in accordance with FIG. 1 from the left by way of a feeding table 1 having a feeding table plate 10, on to which a rotatable isolating or singling device 11, provided for example with a revolving rubber belt, is always lowered when an original is to be drawn from the entry table plate 10 into the photocopying machine. From the singling device 11, the original passes into an entry duct 12 which is formed between two horizontal plates, in which duct it is taken up by several conveyor rollers 14 disposed following one another in the conveying direction and is further transported towards the right in FIG. 1.

The continued feeding movement is taken over, following the last pair of conveyor rollers 14, by a feed mechanism 2 of the photocopying machine. The first station of this feeding arrangement 2 is formed by an entry roller 20, which is rotated clockwise and serves as a guide roller for a conveyor belt 22 of the feed mechanism 2, said belt consisting of a plurality of individual parallel bands. An entry chute 17 for copying paper is formed between the entry roller 20 and the rear end of the bottom plate of the entry passage 12, which end is bent over rearwardly according to FIG. 1; it is at this position that the original is guided into contact with the copying paper. The two paper webs are guided together in a horizontal direction towards an exposure cylinder between the conveyor belt 22 and a guide plate 24, the said cylinder 26 being itself so driven that its periphery is moved in the same direction and at the same speed as the conveyor belt 22. Disposed inside the exposure cylinder 26 is a strong light source, which exposes the copying paper to light through the original.

After leaving the exposure cylinder 26, the original is initially advanced obliquely upwards together with the copying paper into the direction in which the conveyor belt 22 is moved. Arranged on the side facing the original is a separating station 3 which covers the width of the paper and which consists of a perforated suction plate 30 with convex curvature and having a vacuum chamber 32 situated behind it, to which chamber is connected a vacuum pipe 31. Air is continuously extracted from this vacuum pipe 31, so that the original adjacent the suction plate 30 is pulled thereon by vacuum and is pulled off by suction during its transport from the copying paper, which follows the conveyor belt 22. In FIG. 2, the original, which is indicated by the reference 200, is shown by a broken line.

During its entry into the photocopying machine, the original is preferably scanned to determine its length and as a result the positioning of a switch device 38 is initiated, which device is connected in the conveying direction to the suction plate 30, is pivotable about a pivot 66, assumes either the first operating position which is shown in FIG. 3 or the second operating position which is shown in FIGS. 1 and 2, and which consists of a plurality of separate elements arranged parallel to one another with inter-related spacing on a shaft. The first operating position as shown in FIG. 3 is provided for relatively short originals, while the second operating position is provided for relatively long originals.

It is the path of the short originals which is to be first described. In this case, the switch device 38 is situated in the first operating position according to FIG. 3, in which the front wings 64 of the individual elements engage between loose guide rollers 34 which are arranged spaced side-by-side transversely of the conveying direction, the said rollers 34 being situated between separating station 3 and switch device 38 and feeding the original over its full width to the said switch device 38. The original, which is always still driven by the feed mechanism 2 and is guided from the separating station 3 in the curvature of the suction plate 30, reaches after the switch device 38 the widened inlet to a lateral abutment strip 40a. Within this return feeding arrangement 5a for relatively short originals, this abutment strip 40a serves the purpose of so aligning the original laterally that it once again assumes its exact lateral reference position on re-entering the feed mechanism 2 of the photocopying machine. It is necessary for this purpose for the original to be applied by pressure to the abutment strip 40a. This is effected by means of at least one inclined roller 44a.

The manner in which the inclined rollers 44a or 44b operate can be seen from FIGS. 4 and 5. In FIG. 5, two inclined roller arrangements which are of slightly different construction but which have the same effect are shown one above the other. As regards the upper constructional example, the inclined roller 44b is mounted to be rotatable on a guide member 52, which in its turn is rotatably connected by means of a pivot pin 51 to a support 50, which is arranged on the abutment strip 40. A tension spring 54 pulls the guide member 52 into the rest position against a stop (not shown), so that the guide member 51 is skew to a conveyor belt 48 of the return feeding arrangement 5a. As soon as the original (not shown here) enters the gap between the conveyor belt 48 and the inclined roller 44b, the latter endeavours to adjust its axis of rotation perpendicular to the running direction of the conveyor belts 48 as indicated by arrows. As a consequence, a lateral moment is exerted on the original, and the said moment forces the said original against the abutment strip 40. This constructional form is not subject to any limitation in use as regards the slope angle of the conveyor section.

As regards the lower constructional example for an inclined roller arrangement, the said inclined roller 44a is mounted on a two-armed guide member 53, to which the inclining tensile force is not transmitted by a spring, but by a weight 56, which is adjustably secured on a rod 55 which acts as a lever arm and which is arranged as a lateral cantilever or arm on that arm of the guide member 53 which is opposite the inclined roller 44a. A preliminary condition as regards this constructional example is that the pivot pin extends at least approximately horizontally. This constructional form is intended for conveying paths which extend substantially vertically.

The object of being able already to effect the lateral bearing pressure of the original against the abutment strip 40 before the end of the original 200 has left the feed mechanism 2, and therefore more especially the gap between the conveyor belt 22 and exposure cylinder 26, is achieved by the fact that the conveyor belt 48, which consists of a plurality of parallel single belts and the guiding of which is more fully described below, moves somewhat more slowly than the conveyor belt 22 of the feed mechanism 2. Because of this difference in speed and because of the lateral displacement of the leading end of the original towards the abutment strip 40, there is produced in the middel region of the original a curvature such as that which is indicated in FIGS. 2 and 3 by the broken line for the original 200. This curvature or arching is controlled by retainer members 36 and 37 in the region of the switch device 38 which can be deflected upwardly with a small force, and by the vacuum at the suction plate 30. These retainer members 36 and 37 are constructed as fingers consisting of resilient steel plate or the like which can be deflected by a small force.

As is also shown in FIGS. 4 and 5, the conveyor belt 48 of the return feeding arrangement 5a for relatively short originals is formed as a group of several separate belts which extend in parallel relation. Nevertheless, for the sake of simplicity, the expression "conveyor belt" is maintained in the specification. This endless conveyor belt 48 is driven approximately in the middle of the return feeding arrangement between a guide roller 59 and a driving roller 60 and, after being deflected over a plurality of tensioning rollers 62, first of all reached a guide roller 59, which is adjacent the conveyor belt 22 of the feed mechanism 2. From this point, the conveyor belt 48 is guided over that surface of the suction plate 30 which is of convex curvature and then runs through the inlet into that straight section which is shown in FIG. 5 and which has the lateral bearing strip 40a, where the conveyor belt passes beneath the inclined roller 44a. At the end of the lateral abutment or bearing strip 40a, which can be adjusted laterally by means of a guiding and adjusting device 42a, the conveyor belt 48 reaches with a curvilinear path its lowermost guiding roller 5, which is disposed at a slight distance above the entry roller 20, until finally it passes into the driving gap, which is formed between the driving roller 60 and the adjacent guide roller 59.

However, if as a departure from the previous part of the specification, a relatively long original is introduced into the feed arrangement 2, then it is possible by means of a scanning and control device (not shown) for the switch mechanism 38 to be swung into its second operative position which is shown in FIGS. 1 and 2. In this case, the sharp front edges of the forward wings 64 bear against that end of the curved suction plate 30 which is at the rear in the conveying direction and as a result deflect the leading edge of the arriving original 200 in an upward direction, so that the said original is advanced between the upper edge of the switch arrangement 38 and the free guide rollers 34. As a consequence, the retainer 36 is also displaced upwardly, but initially only into a middle position which is not shown and which is approximately at the height of the top edge of the switch arrangement 38. Consequently, the front or leading edge of the original is deflected into a gap which is formed between the upper edge of the switch device 38 and a guide plate 70 situated thereabove. This gap constitutes the entry point to a second longer return feeding arrangement 5b. This latter has an endless conveyor belt 74, which is likewise composed of several parallel separate bands. Initially, the original passes beneath a guide roller 71 and then reaches the widened inlet to a lateral abutment strip 40b, which is similar to the strip 40a already described and is also laterally adjustable by way of a guiding and adjusting device 42b. It is the object of this guiding and adjusting device so to align that side edge of the original 200 which is guided thereby that the original, on entering the feed mechanism 2, assumes the same nominal position as that of an original previously arriving from the entry table 1.

Arranged behind the guide roller 71, which is formed as a very easily running roller assembly positioned behind the separate runs of the conveyor belt 74, is a probe device which is not shown and which responds to the arriving original and, during its time of passage, temporarily switches off the vacuum on the suction plate 30 of the separating station. The operation of aligning the front portion of the original in relation to the lateral bearing strip 40b is facilitated in this way, because the reaction resulting from the rear portion which is still guided in the old direction is substantially eliminated.

Arranged at the end of the abutment stri 40b is a switch device 78, which is capable of being swung vertically and leads to an ejector device which is to be later described, but which, in the present case of operation, is swung downwardly opposite to what is shown in FIG. 1, and allows the original to continue moving without hindrance in the extension of the said strip 40b. While the conveyor belt 74 behind the switch device 78 revolves around a large deflecting roller 76 with a wrapping angle of 180°, the original only conditionally follows this curvature and is guided inwardly by a curved guide plate into a guide gap 82 which is directed obliquely downwards and which is formed between two adjacent plates. After leaving this guide gap 82, the front edge of the original reaches the gap which is formed between the front two conveyor rollers 14 of the entry table 1 and is now drawn into the entry passage 12. Thereafter, the original once again reaches the feed mechanism 2, in order once again to be copied. The larger repeat circuit of the return feed arrangement 5b is thus closed.

As soon as that number of copies of the same original, as set by a programming device (not shown), has been produced, the original is ejected. During the ejection operation, the switch device 38 always assumes the second operative position which is shown in FIGS. 1 and 2, regardless of whether a short or long original is involved, so that the original is initially introduced into the initial circuit of the longer return feeding arrangement 5b and thereby passes through the region of the lateral abutment or bearing strip 40b. The switch device 78 is now swung into the upper operative position as shown in FIG. 1 and the original is deflected into a gap which is formed by two driven guide rollers 84. A retainer device 75 arranged in the region of the switch device 78 is elastically deflected upwardly, and the original leaves the photocopying machine by way of an upper ejector chute 85, where it finally takes up a position on a depositing surface 86.

The invention is claimed as follows:

1. Photocopying machine comprising a repeat mechanism which, after an original has left the exposure station, optionally returns said original into the entry position, a feed mechanism guiding the original and the copying material past an exposure station, a separating station arranged in the feeding direction behind the exposure station having means for detaching the original from the copying paper and a return feeding mechanism which picks up the original, supplies the original to the entry members at the entry position and moves it simultaneously for the purpose of alignment against a lateral bearing or abutment edge, wherein the conveying speed of the return feeding mechanism is somewhat less than that of the feeding mechanism and a loop of the original is formed between the return feeding mechanism and said feed mechanism.

2. Photocopying machine according to claim 1, comprising means for switching off the separating station including a probe cooperating with the original as soon as the latter has reached the return feeding mechanism.

3. Photocopying machine according to claim 1, wherein there are characterized two return feeding mechanisms which are independent of one another and have return paths of different length, and a switch device behind the separating station in the feeding direction to guide the original, depending on its length, into one or the other of the return feeding mechanisms.

4. Photocopying machine according to claim 1, wherein the return feeding mechanism comprises an aligning roller and a cooperating feed roller, said aligning roller being mounted on a rocking lever and means for pulling said rocking lever into an inclined position, said aligning roller swinging into a position axially parallel with the feed roller when the original is supported on the bearing edge.

5. Photocopying machine according to claim 4, wherein the pullling means comprises a spring.

6. Photocopying machine according to claim 4, wherein the pulling means comprises a weight.

7. Photocopying machine according to claim 1, wherein the transporting speed of the return feeding mechanism is substantially 10% below that of the feed mechanism.

* * * * *